No. 849,150. PATENTED APR. 2, 1907.
W. MAZZOCCO.
SHOCK ABSORBER.
APPLICATION FILED SEPT. 28, 1906.
2 SHEETS—SHEET 1.
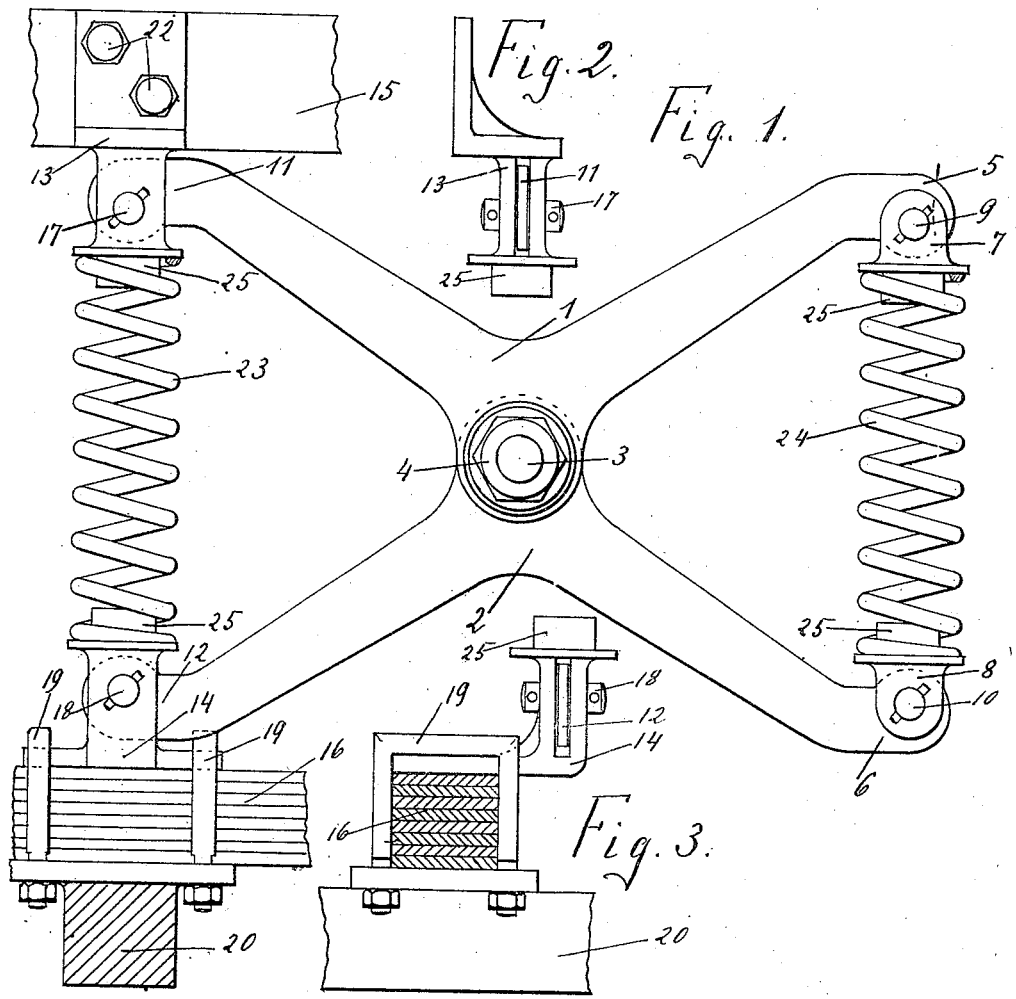
WITNESSES:
H. A. Janke
O. Knight jr.
William Mazzocco
INVENTOR
BY Knight Bros.
ATTORNEYS.

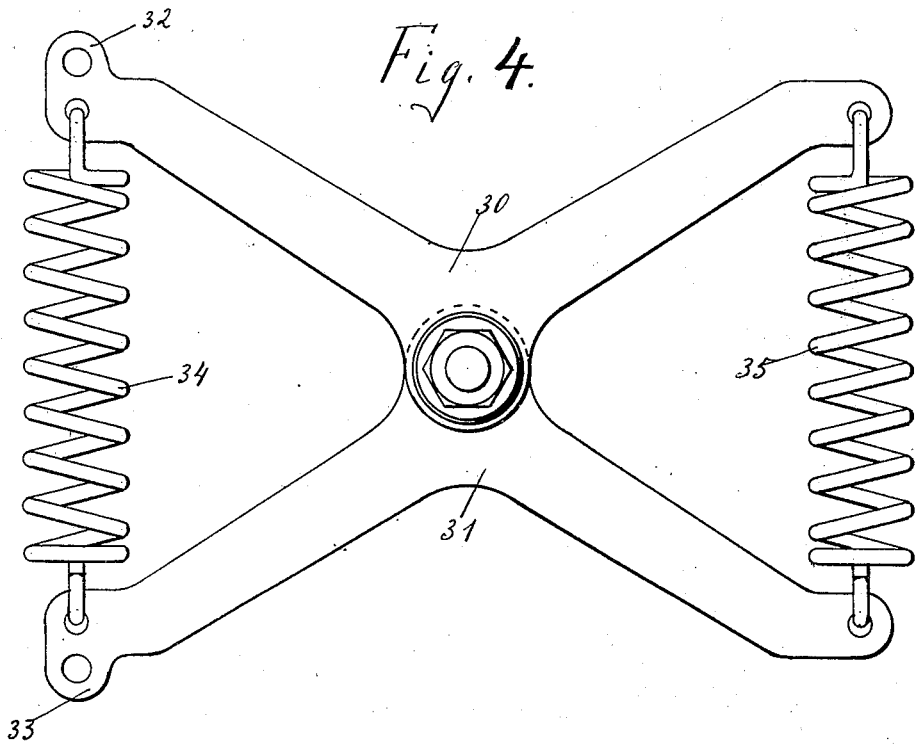

derlying principle (sic) of the invention.

UNITED STATES PATENT OFFICE.

WILLIAM MAZZOCCO, OF PLAINFIELD, NEW JERSEY.

SHOCK-ABSORBER.

No. 849,150.  Specification of Letters Patent.  Patented April 2, 1907.

Application filed September 28, 1906. Serial No. 336,589.

*To all whom it may concern:*

Be it known that I, WILLIAM MAZZOCCO, a subject of the King of Italy, a resident of Plainfield, county of Union, State of New Jersey, have invented certain new and useful Improvements in Shock-Absorbers, of which the following is a specification.

My invention relates to a shock-absorber for vehicles and cars of all kinds, which operates by means of springs arranged so that one spring takes up the recoil of another when the mainspring of the vehicle or car is in action.

The present shock-absorbers with air-cushions alone or air-cushions with opposing springs have the disadvantage that in riding over several rough spots in rapid succession the device has not time enough after taking up the first shock to return to its original position in order to take up entirely the subsequent shock, as the air or fluid in the cushion cannot rush in or out of the cylinder fast enough to allow the piston to return to its normal position. This fact not only impairs the action of the device itself, but stiffens at the same time the action of the mainspring of the vehicle. Shock-absorbers operating by friction alone have the disadvantage that the friction to which they are adjusted decreases by the continuous motion of the frictional disks even after only a short traveling distance of the vehicle, as long tests have proven, and therefore require constant adjustment. By the present invention all these disadvantages are overcome by means of the novel arrangement of the shock-absorbing springs.

In the accompanying drawings, Figure 1 is a side view of the device. Fig. 2 is a front view of the head-piece and bracket connected with the vehicle-frame. Fig. 3 is a front view of the head-piece and bracket connected with the vehicle-spring. Fig. 4 is a modification of Fig. 1, showing retraction-springs instead of expansion-springs.

In Fig. 1, 1 2 are two two-armed levers pivoted in their common fulcrums by the bolt 3 and held together by the nut 4, which may of course be tightened so as to obtain any suitable friction between the two levers in their common fulcrum. The ends 5 6 of the levers are suitably shaped to fit movably into the forked head-pieces 7 8, which are pivotally fastened to the levers by the bolts 9 10. The ends 11 12 of levers 1 2 are suitably shaped to fit into the forked brackets 13 14, which are to these ends 11 12 pivotally fastened by the bolts 17 18. Bracket 13 is fastened, besides, to the vehicle-frame 15 by screws 22 and bracket 14 to the vehicle-spring 16, under the clips 19, by which spring 16 is fastened to the vehicle-axle 20 in the well-known manner.

Between brackets 13 and 14 and head-pieces 7 and 8 are inserted the coil-springs 23 and 24, respectively, and prevented from slipping out by the studs 25, which form a part of the head-pieces and brackets.

In case of the form shown in Fig. 1 the springs have to be inserted between the levers under a certain compression in order to prevent each spring from slipping out of its head-pieces when the jaws on that side open. Fig. 1 shows the device in normal position.

It will be readily seen that if axle 20, with mainspring 16, approaches vehicle-frame 15, caused by the vehicle striking the unevenness of the road, coil-spring 23 will be compressed, and thus aid spring 16. In rebounding spring 16 will open the jaws or arms 11 and 12 beyond their normal position, (shown in Fig. 1,) and consequently cause the arms 5 and 6 to close and to compress spring 24, which counteracts this motion of the levers, and thus checks the rebound of spring 16.

Instead of using springs acting by means of their expansion, as shown in Fig. 1, one may use between the levers to the same advantage springs acting by means of their retraction, as shown in Fig. 4.

The retraction-springs 34 and 35 are suitably fastened to the arms of levers 30 and 31. One end of one lever 30 is suitably fastened to the vehicle-frame by the eye 32 and one end of lever 31 to the vehicle-spring by eye 33. The vehicle-spring in taking up the first impact of the shock, and thus coming nearer to the vehicle-frame, is opposed by the retraction-spring 35, as the jaws on that side will then open. During the rebound of the vehicle-spring, in which the latter one recedes from the vehicle-frame beyond its normal position, retraction-spring 34 will come into action and check the rebound.

One will readily see that my shock-absorber has the great advantage that the springs between the levers will instantly follow and counteract any motion of the mainspring of the vehicle without causing thereby any wear by friction, as is the case, for instance, in the shock-absorber operating by frictional disks, as already stated before.

While I have shown in the drawings the springs fastened with their head-pieces to the ends of the levers, they may as well be fastened to the same advantage at any intermediate suitable point of the lever-arms without changing the scope of my invention.

Having thus described my invention, what I claim as new, and desire to secure by Letters Patent, is—

1. In a shock-absorber, the combination with a pair of levers fulcrumed together at an intermediate point and opening at one side when closed at the opposite side; of means between said levers yieldingly opposing relative motion in either direction between said levers.

2. In a shock-absorber, the combination with a pair of levers fulcrumed together at an intermediate point and opening at one side when closed at the opposite side, of yielding means between said levers at each side tending to oppose relative motion between the levers in either direction beyond the normal intermediate position.

3. In a shock-absorber, the combination with a pair of levers fulcrumed together at an intermediate point and opening at one side when closed at the opposite side, of springs between said levers opposing relative motion in either direction between said levers.

4. In a shock-absorber, the combination with a pair of levers fulcrumed together at an intermediate point and opening at one side when closed at the opposite side, of springs between the levers at each side tending to oppose relative motion between the levers in either direction beyond the normal intermediate position.

5. In a shock-absorber for vehicles, the combination with a pair of levers fulcrumed together at an intermediate point and opening at one side when closed at the opposite side and means between said levers yieldingly opposing relative motion between the levers in either direction, of suitable means for securing said levers at one side to the vehicle-body and the vehicle-spring respectively.

6. In a shock-absorber, the combination with a pair of levers fulcrumed together at an intermediate point and opening at one side when closed at the opposite side and springs between said levers opposing relative motion between the levers in either direction, of suitable means for securing said levers at one side to the vehicle-body and the vehicle-spring respectively.

7. In a shock-absorber for vehicles, the combination with a pair of levers fulcrumed together at an intermediate point and opening at one side when closed at the opposite side and means between said levers yieldingly opposing relative motion between the levers in either direction, of means for pivotally connecting said levers at one side to the vehicle-body and the vehicle-spring respectively.

8. In a shock-absorber, the combination with a pair of levers fulcrumed together at an intermediate point and opening at one side when closed at the opposite side and springs between said levers opposing relative motion between the levers in either direction, of means for pivotally connecting said levers at one side to the vehicle-body and the vehicle-spring respectively.

9. In a shock-absorber, the combination with a pair of levers fulcrumed together at an intermediate point, and head-pieces pivotally connected with said levers; of springs between said levers fitting into said head-pieces, yieldingly opposing the relative motion in either direction between said levers.

10. In a shock-absorber, the combination with a pair of levers fulcrumed together at an intermediate point, and head-pieces pivotally connected with said levers, of springs between said levers fitting into said head-pieces yieldingly opposing the relative motion in either direction between said levers beyond a normal intermediate point.

11. In a shock-absorber for vehicles, the combination with a pair of levers fulcrumed together at an intermediate point, springs opposing relative motion between the levers in either direction, and head-pieces pivotally connected with said levers and adapted to receive the ends of said springs, of brackets suitably connected with one end of each lever for securing said levers to the vehicle-body and the vehicle-spring respectively.

12. In a shock-absorber for vehicles, the combination with a pair of levers fulcrumed together at an intermediate point, springs opposing relative motion between the levers in either direction beyond a normal intermediate position and head-pieces pivotally connected with said levers and adapted to receive the ends of said springs, of brackets suitably connected with one end of each lever for securing said levers to the vehicle-body and the vehicle-spring respectively.

WILLIAM MAZZOCCO.

Witnesses:
H. ALFRED JANKE,
EDWARD B. RYDER.